(12) United States Patent
Stanzel et al.

(10) Patent No.: US 7,750,600 B2
(45) Date of Patent: *Jul. 6, 2010

(54) METHOD AND APPARATUS FOR CHARGING BATTERIES WITH MULTIPLE OUTPUT CIRCUITS

(76) Inventors: David A. Stanzel, 4509 Starlight Ct., Appleton, WI (US) 54913; Jon O. Reynolds, 2018 Hickory Ct., Appleton, WI (US) 54914

( * ) Notice: Subject to any disclaimer, the term of this patent is extended or adjusted under 35 U.S.C. 154(b) by 52 days.

This patent is subject to a terminal disclaimer.

(21) Appl. No.: 12/259,597

(22) Filed: Oct. 28, 2008

(65) Prior Publication Data

US 2009/0102417 A1 Apr. 23, 2009

Related U.S. Application Data

(62) Division of application No. 10/915,097, filed on Aug. 10, 2004, now Pat. No. 7,446,503.

(51) Int. Cl.
*H01M 10/46* (2006.01)
(52) U.S. Cl. .................................... 320/116
(58) Field of Classification Search ................ 320/106, 320/110, 114, 138, 141
See application file for complete search history.

(56) References Cited

U.S. PATENT DOCUMENTS

| 5,601,741 A | 2/1997 | Thommes |
| 6,236,014 B1 | 5/2001 | Ulrich |
| 6,329,636 B1 | 12/2001 | Geissler |
| 6,538,909 B2 | 3/2003 | Goodarzi et al. |
| 6,621,248 B1 * | 9/2003 | Li .............................. 320/125 |
| 7,202,636 B2 * | 4/2007 | Reynolds et al. ............ 320/166 |

* cited by examiner

*Primary Examiner*—Edward Tso
(74) *Attorney, Agent, or Firm*—George R. Corrigan

(57) ABSTRACT

A method and apparatus for charging batteries includes using an input rectifier to receive an ac input and provide a dc signal. A converter receives the dc signal and provides a converter output. An output circuit receives the converter output and provides a battery charging signal. A controller preferably controls the converter to power factor correct. The system can include multiple output circuits, used either singly or at the same time, and designed for one or more voltages. They can be user removable. Preferably, the converter output has a magnitude independent of a range of frequencies and a range of magnitudes of the ac input, and the range can be, for example, at least a factor of two or at least two utility voltages. The controller includes a charging schedule module that receives feedback, such as voltage and/or current feedback and/or temperature feedback. The output circuit, such as a dc-dc converter, is controlled in response to the feedback in other embodiments. The battery type may be sensed or input by a user, and the charging done in response to the battery type. A defective battery sensor is preferably included, with a user-noticeable indicator.

48 Claims, 3 Drawing Sheets

METHOD AND APPARATUS FOR CHARGING BATTERIES WITH MULTIPLE OUTPUT CIRCUITS

RELATED APPLICATIONS

This is a divisional of, and claims the benefit of the filing date of, U.S. patent application Ser. No. 10/915,097, filed on Aug. 10, 2004.

FIELD OF THE INVENTION

The present invention relates generally to the art of battery charging. More specifically, it relates to battery charging using versatile circuitry that can preferably receive multiple inputs and/or provide multiple outputs.

BACKGROUND OF THE INVENTION

There are a large number of rechargeable batteries having a wide variety of voltages and charging schedules. (Charging schedule, as used herein, is the manner in which the charging is performed for a given battery. For example, one charging schedule might call for a limited amount of current initially, and then a greater current when the battery voltage crosses a threshold, followed by a trickle charge after the battery voltage crosses a second threshold.) It is typical that a charger be designed for a single battery type, and have a single output voltage and charging schedule. Of course, dedicated battery chargers are not versatile, and can require a facility to have a number of chargers.

Other chargers are not dedicated, but are "dumb" chargers that apply a constant voltage output with the charging current being controlled by the load, not the charger. These chargers might work for any battery of a given voltage, but do not optimally charge batteries. Thus, if such chargers are used to charge several batteries simultaneously, they cannot provide a unique charging current or voltage for each battery. Rather, a single charging schedule is used for all batteries being charged. This also diminishes the usefulness of chargers.

Some battery chargers are inefficient because they have a poor power factor. This causes increased costs when power is utility power, and can lessen the charging capacity, particularly when using generator power. The use of generator power can cause another problem—generators often provide "dirty" power, i.e., power that is not perfectly sinusoidal, or not of a constant value. Dirty power can result in improper charging.

Prior art battery chargers are often design for a single input voltage and frequency. While this might be sufficient for consumer battery chargers, some applications, such as industrial battery charging, or automotive charging, might be used at different locations where the input power is not the same.

Rechargeable batteries have a finite life, in that their ability to be charged diminishes over time. Often, a user finds the battery is no longer chargeable by charging it, then using it, and having the battery become discharged in a short period of time.

Accordingly, a battery charger that is versatile enough to charge different types of batteries, or to simultaneously charge batteries with different outputs, is desirable. A modular design, where output circuits for particular batteries can be switched in and out by the user, is one manner to allow different charging schedules. Also, a single output module could be used for any battery type, where the user selects the battery type, or the charger senses the battery type. Preferably, such a charger will provide power factor correction, and be able to receive a wide range of inputs. Also, it will preferably be able to receive dirty power, and still charge a battery. A charger that provides the user a warning when a battery is defective is also desirable.

SUMMARY OF THE PRESENT INVENTION

According to a first aspect of the invention a battery charger and method of charging a battery include using an input rectifier to receive an ac input and provide a dc signal. A converter receives the dc signal and provides a converter output. An output circuit receives the converter output and provides a battery charging signal. A controller controls the converter to power factor correct.

According to a second aspect of the invention a battery charging system and method includes an input circuit that receives an input signal and provides a dc signal. A plurality of user-removable output circuits are designed to receive the dc signal and provide a battery charging signal at a desired voltage and a desired current, and only one of the output circuits is connected at a time. A controller, controls the connected output circuit.

According to a third aspect of the invention a battery charging system and method includes an input circuit that receives an input signal and provides a dc signal. A plurality of output circuits are connected at the same time, and receive the dc signal and provide a battery charging signal at a desired voltage or voltages and a desired current or currents. A controller provides a control signal to each of the output circuits.

The converter output has a magnitude independent of a range of frequencies and a range of magnitudes of the ac input in one alternative.

The converter output has a substantially constant magnitude for a range of inputs spanning at least a factor of two or at least two utility voltages in various embodiments.

The controller includes a charging schedule module. The charging schedule modules receives voltage feedback and/or current feedback. The output circuit is a dc-dc converter controlled in response to the feedback in other embodiments.

The controller includes a battery selection input, and controls the charger in response to the battery selection input. The selection input is responsive to a user-selection, or a wired or wireless battery type sensor, such as an RFID sensor, in various embodiments.

The output circuit is designed for a particular battery voltage and the output circuit may be removable in another embodiment.

Additional output circuits, for the same or different voltages, and for use one at a time, or a plurality at a time, and user removable or fixed, are provided in various embodiments.

The converter may be a boost converter, a buck-boost converter, and a combined rectifier boost converter in various alternatives.

The output circuit may be a switched converter, a pulse width modulated inverter, a pulse width modulated forward converter, or a frequency modulated in other embodiments.

A defective battery sensor module receives current, voltage or temperature feedback and determines if a battery is defective is provided in another embodiment. A user-noticeable indicator is provided when a defective battery is detected.

Power for the controller is derived independent of the input in another embodiment.

Other principal features and advantages of the invention will become apparent to those skilled in the art upon review of the following drawings, the detailed description and the appended claims.

Figure 1:
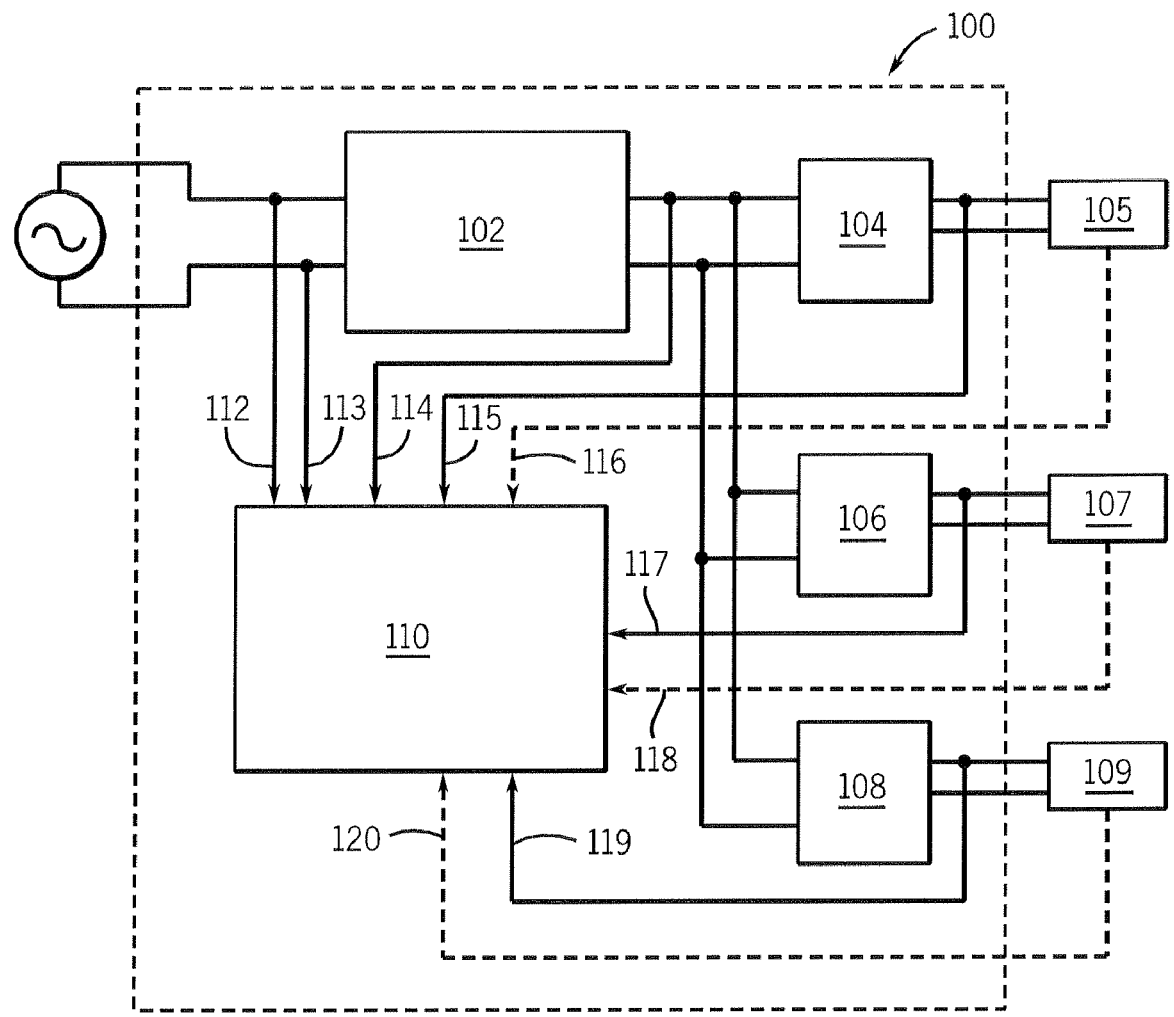
FIG. 1 is a block diagram of a battery charger in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular battery charger and particular circuitry, it should be understood at the outset that the invention may also be implemented with other circuitry, software and arrangements.

Generally, the invention is implemented by a battery charger that receives an input, such as an ac input, and provides a dc charging output. Preferably, the battery charger may receive any input over a range of inputs without being reconfigured (i.e., re-linked or re-wired), and may be capable of receiving "dirty" power, such as that from a generator. Also, the battery charger preferably includes an output stage that can either provide a number of voltages for charging different batteries, any voltage, or be designed for a single voltage. There can be a plurality of user-removable output stages. When the output circuits provides a single voltage, or a narrow range of voltages for charging one battery voltage, it is said to be designed for a particular battery voltage. In one embodiment a number of output stages are provided, each for charging one battery, wherein the batteries are of the same type or of different types.

When the output circuit is capable charging different battery types, the user can set the battery type or voltage, or the charger can include a sensor. The sensor could be wired (i.e., connected to the battery and either sense an ID signal, or sense the voltage of the battery), or wireless, such as an RFID sensor to sense an RFID tag on a battery. The charger preferably includes a controller that causes the output to follow a charging schedule based on the battery type and/or voltage.

Another feature the charger preferably has is a "bad" battery detector, wherein the controller senses that a battery is not properly charging. The user is notified of the bad or defective battery. Another alternative provides a polarity detector to prevent damage to the battery and/or charger if the battery is connected with the wrong polarity.

The power provided for battery charging is not always ideal utility power, but might be "dirty" generator power. The present invention can provide a battery charger that is capable of running off a generator source (as well as a utility source). A capacitor or other energy storage device delivers energy to a dc bus in such a way as to reduce the impact of dirty power on the charging circuit and allows for charging during heavy loading of the generator source.

One advantage of the preferred embodiment is that it will operate using a wide range of input powers, and thus is well-suited for applications or users that use the charger in multiple locations. Various embodiments provide for an input range of at least a factor of 2, at least two utility voltages (115-230V, or 100-256V e.g.), 120V to 525V, or 100V to 633V. The preferred embodiment is relatively lightweight, adding to the charger portability. Additionally, the power circuit does not need to be re-linked or reconfigured by the user for different powers, thus there is less of a need to open the housing.

The details of the preferred embodiment will be provided below, but they generally include a rectifier, followed by a boost converter or a buck-boost converter, followed by a dc-dc converter, such as a pulse width or frequency modulated inverter or forward converter. A controller controls the boost converter to provide a dc bus having a desired magnitude, regardless of the magnitude and frequency of the input (within ranges), and to actively power factor correct the input. The controller also controls the dc-dc converter using feedback of the battery charging signal. Battery charging signal, as used herein, includes the signal used to charge the battery. For example, the charging current is controlled using a current feedback loop. A voltage feedback loop may be used to stop the charging process, or to change to a trickle charging mode. Controller 110 may use functions of the current and/or voltage feedback and/or temperature feedback, such as power, energy, and integrals and derivatives of the output parameters. While the feedback signals are typically indicative of a magnitude, the controller may be responsive to the signal by using a function of the value feedback.

When using the features described above, a versatile charger may be made that is capable of receiving a wide range of inputs, and charging a wide range of batteries, having a number of voltages. For example, multiple output stages may be provided and each run off the common bus. Each output stage may be controlled independently of the others, to charge either the same type of batteries, or different batteries, either one at a time, or a plurality at a time.

Referring now to FIG. 1, a block diagram of a preferred embodiment of a charging system 100 is shown. Charger 100 includes a preregulator 102, a plurality of output circuits 104, 106, and 108, a controller 110, and feedback lines/control inputs 112-120 that cooperate to charge batteries 105, 107 and 109. While the embodiment illustrated includes three output circuits, other embodiments include fewer (including just one) output circuit, or many more output circuits. In various embodiments output circuits 104, 106 and 108 are fixed in place, or user interchangeable or user-removable. Controller 110 may be located on a single board or dispersed among several boards. It may be particularly useful to disperse controller 110 among several boards, one in a housing with the preregulator, and one with each output circuit, when the output circuits are user-removable.

User-removable, as used herein, includes a portion of the system being housed in such a way as the user can remove it and replace it with relative ease. For example, batteries on cordless power tools are user-removable, as are batteries in automobiles. Depending upon the application and sophistication of the user, more or less effort by the user is required to remove the output circuit.

Figure 2:
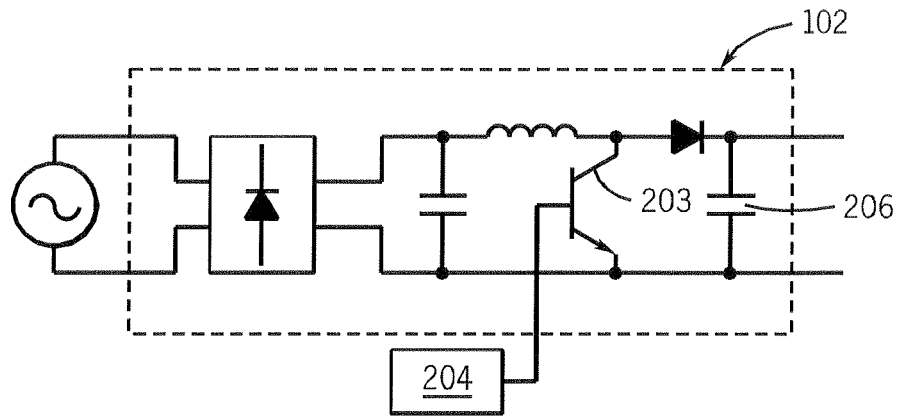
FIG. 2 is a circuit diagram of a preregulator in accordance with the preferred embodiment.
Figure 3:
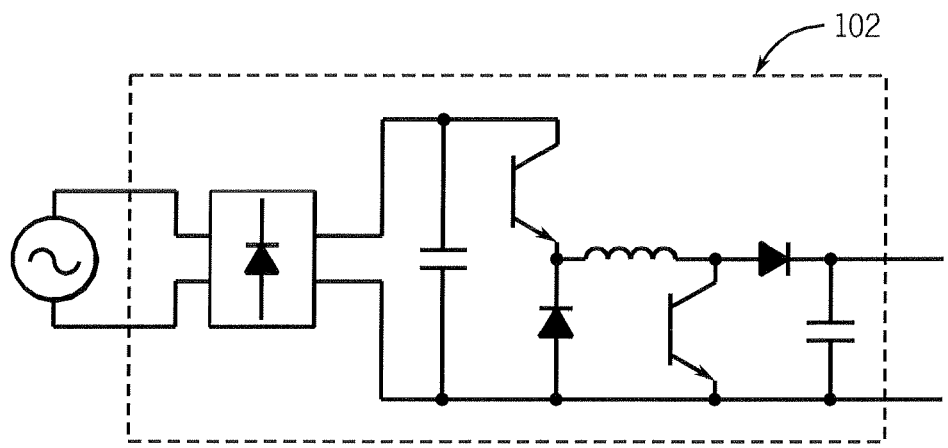
FIG. 3 is a circuit diagram of an alternative preregulator in accordance with the preferred embodiment.
Figure 4:
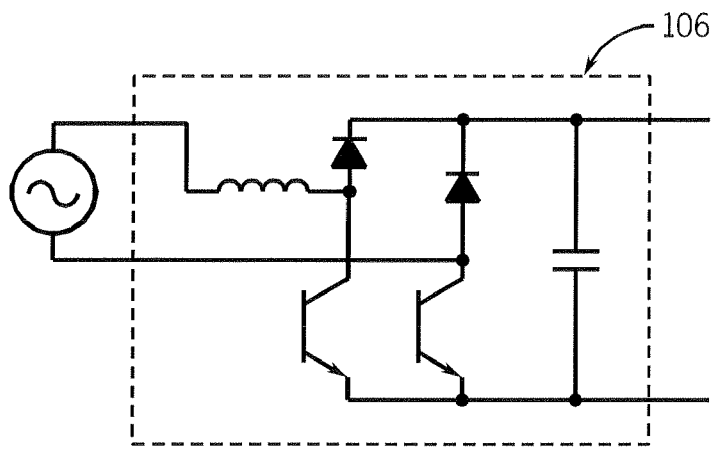
FIG. 4 is a circuit diagram of an alternative preregulator in accordance with the preferred embodiment.

The preferred embodiment provides that preregulator 102 includes a full or half-bridge rectifier (input circuit) and a boost or buck-boost circuit. Examples of such circuits are shown in FIGS. 2 and 3. Their operation is well known, and won't be described herein but a boost circuit can increase an input voltage to a desired magnitude, and a buck-boost circuit can increase or decrease an input voltage to a desired magnitude. In various embodiments the rectifier is omitted (for dc inputs, e.g.), or combined with the boost circuit, such as shown in FIG. 4. Combined rectifier-boost, as used herein, includes a circuit such as FIG. 4, where the rectifier is part of the boost circuit.

Preregulator 102 receives an ac input and provides a dc bus. AC input, as used herein, includes any utility, generator, or other ac signal. The input can be of a different type, such as dc, in other embodiments. If a dc input is used, a rectifier is not needed. The signal that causes the switch in the boost or buck-boost converter to change states is received on a control input (an input for control rather than power signals). The operation of the preregulator results in a dc bus that is has a magnitude independent of the input magnitude, and is dc, independent of the input frequency. Thus, the input signal may have any frequency and magnitude within a range of magnitudes and a range of frequencies, and preregulator 102 will still provide the desired dc bus.

Alternative embodiments include other preregulator switched converters, such as a buck, SEPIC, or CUK converter. Converter, as used herein, includes a power circuit that receives or provides an ac or dc signal, and converts it to the other of an ac or dc signal, or to a different frequency or magnitude.

Controller 110 preferably controls the preregulator to be power factor corrected to improve efficiency. The power factor correction is active, in that the controller switches the boost switch 203 to increase the power factor. The power factor correction may be accomplished using a power factor correction circuit 204 (located in controller 110), such as an off the shelf integrated circuit that provides power factor correction for boost circuits.

The output of the preregulator is a dc bus at a voltage controlled by controller 110. The preferred embodiment provides that the converter output (a dc bus) be controlled to have a voltage of 950V regardless of the input voltage or frequency. Other bus voltages may be used.

Controller, as used herein, includes digital and analog circuitry, discrete or integrated circuitry, microprocessors, DSPs, etc., and software, hardware and firmware, located on one or more boards, used to control a device such as a preregulator, power circuit, or output circuit. Controller 110 receives power from a controller power source which may be a separate transformer based source, battery, or the dc bus.

The dc bus is maintained at a substantially constant voltage (there may be ripple voltage or other voltage perturbations that do not adversely impact performance) by capacitors 206 (which may be implemented with one or more capacitors). The invention contemplates that "dirty" power might be used to charge batteries. Thus, the capacitance is selected to overcome the problems caused by dirty power.

Over time, the energy provided by the generator source must be greater than the energy used to charge the batteries. However, for lengths of time on the order of the period of the input power the charging energy maybe greater than the generator-provided energy. DC bus capacitors 206 have a capacitance, according to the present invention, sufficient to provide the difference between needed output power when and the available generator power. In the preferred embodiment, dc bus capacitor 206 can store an amount of energy equal to the energy (over time) available in approximately 2.75 cycles of the input signal, or in other words, an amount of energy equal to the input signal $E=2.75(P)(T)$ joules, where P is the maximum output of the charger (combined for all output circuits) and T is the period of the generator ac signal. This overcomes the transients that occur in the input power which are typically on the order of a cycle T in length. In alternative embodiments of the present invention, capacitor 206 can store an amount of energy at least equal to the energy (over time) available in at least 1.5 cycles of the input signal (or in other words, $E=1.5(P)(T)$), in at least 2 cycles of the input signal ($E=2(P)(T)$), or in at least 2.5 cycles of the input signal ($E=2.5(P)(T)$).

Thus, the capacitance of capacitor 206 is $C=5.5(P)(T)/(V^2)$, where V is the bus voltage for $E=2.75(P)(T)$, or energy for 2.75 cycles, and $C=3(P)(T)/(V^2)$, where for 1.5 cycles, and $C=4(P)(T)/(V^2)$, for 2 cycles and $C=5(P)(T)/(V^2)$ for 2.5 cycles.

In the preferred embodiment, the approximate values of P, T, and V are: P=1250 watts, T=16.67 milliseconds (or 20 msec for 50 Hz), and V=950 volts. This results in a capacitance value for capacitor 206 of at least 127 microfarads in the preferred embodiment, and capacitance values of at least 70 microfarads, at least 92 microfarads, and at least 115 microfarads, for the various equations for C described above.

Figure 5:
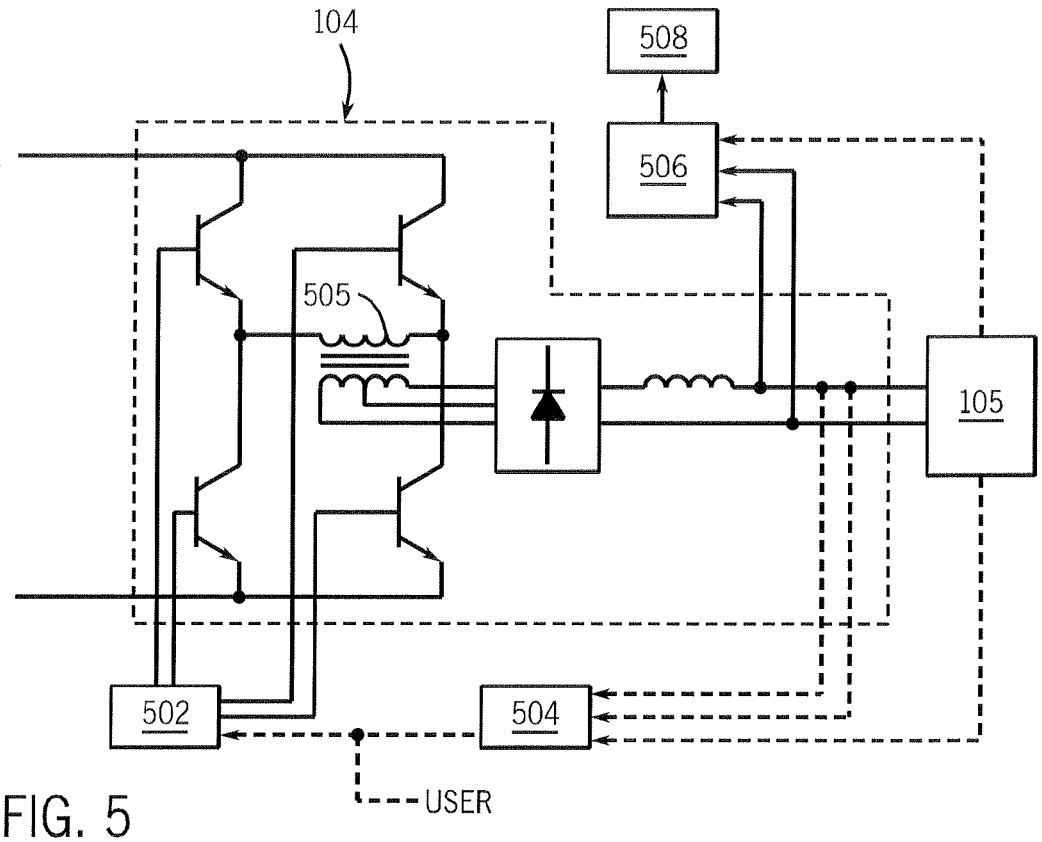
FIG. 5 is a circuit diagram of an output circuit in accordance with the preferred embodiment.
Figure 6:
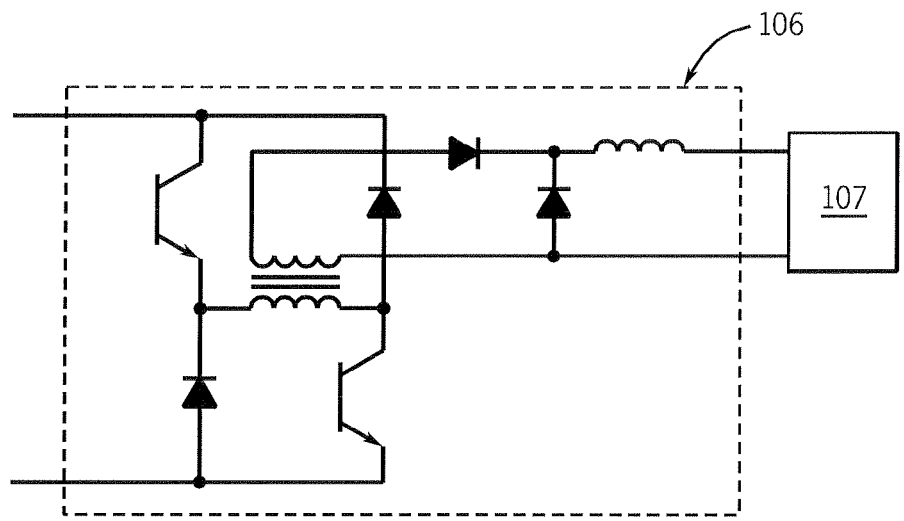
FIG. 6 is a circuit diagram of an output circuit in accordance with the preferred embodiment.

Referring now to FIGS. 5 and 6, example of preferred output circuits 104 and 106 are shown. The embodiment shown in FIG. 5 is a pulse-width modulated inverter, and the embodiment of FIG. 6 is a forward converter. The general operation of both circuits is well known. Other embodiments contemplate frequency modulation and/or other output converters, particularly converters that switch a signal applied to a transformer primary, and provide the output through the transformer secondary, thereby isolating the input and output.

The embodiment of FIG. 5 includes an inverter that, for example, inverts the 950 v bus through the primary of transformer 505. The secondary of center-tapped transformer 505 is rectified and the dc signal is provided to charge the battery. Controller 110 modulates the pulse widths to provide a desired output. Various embodiments include full or half bridge topologies, or other topologies. The signal used to pulse width or frequency modulate or otherwise control the load current and/or voltage may be called a load control signal. The preferred output circuits are easily controlled to provide any output voltage. Thus, they may be used for any type of battery within a range, so long as the battery is identified (by the user or sensed, e.g.), and a charging schedule is available for that battery. Also, the preferred output circuits may be dedicated to a single battery voltage and/or type, for example by including control circuitry with the output circuit.

In one embodiment, a portion of controller 110 is included in the housing that houses output circuit 104, and monitors the output current to provide a desired charging current, in accordance with a charging schedule provided by a charging schedule module 502 (which is part of controller 110). Module, as used herein, includes software and/or hardware that cooperates to perform one or more tasks, and can include digital commands, control circuitry, power circuitry, networking hardware, etc. A charging schedule module is a module that provides a charging schedule.

Charging schedule module 502 includes a current module responsive to current feedback and a voltage module responsive to voltage feedback in the preferred embodiment. The current feedback may be considered part of an inner control loop. Voltage feedback is used in an outer control loop, to determine when the battery is nearly charged, and when the battery voltage crosses a threshold, the charging current is greatly reduced to a trickle charge. Other embodiments provide for monitoring the battery temperature, and reducing charging current based on temperature. The charging schedule can include any needed feature, such as an initial slow charge, a discharge mode, a trickle charge, etc. Integrated circuits that provide a charging schedule are commercially available.

The housing containing output circuit 104 may also include a battery sensor 504, which is part of controller 110 and senses battery 105, and provides a signal indicative of the battery type and/or voltage to charging schedule module 502. Battery sensor 504 may be wired or wirelessly connected to battery 105. A wired connection allows battery sensor 504 to determine the battery voltage and/or type from the battery terminals, or from a separate terminal on the battery which provides information of voltage and/or type. Battery sensor, as used herein, is a sensor that determines battery type and/or voltage. The battery sensor can be part of controller 110, or part of the output circuit.

A wireless connection is made when the battery has a wireless transmitter which transmits information of the battery type and voltage. One such wireless system is an RFID (radio-frequency identification) system. An RFID tag which transmits information is placed on the battery, and sensor 504 includes an RFID receiver which receives the information. The information transmitted and received can be similar to "bar code" information, or it can be more or less complex. Sensor 504 is an optical bar code reader, a WIFI receiver, a magnetic strip reader or other wireless reader various embodiments. Controller 110 includes a battery selection input that receives the information from the sensor. Battery selection input, as used herein, includes any input that receives information, sensed or provided by the user, of battery voltage and/or type. The charging schedule module is responsive to battery selection input, in that the charging schedule is chosen or modified based on the battery type.

The battery type and/or voltage is provided on a user-selectable input, such as a panel knob, button or selector, or by instructions sent on by pda, computer, wireless controller, etc. in various embodiments to the battery selection input on controller 110. User-selectable input, as used herein, includes any input sent from the user, either locally or remotely.

According to various embodiments each output circuit is designed for a particular battery type and/or voltage. The output circuits may be permanently fixed or user removable. Thus to charge a 12 volt automotive battery the user selects the 12 volt output circuit, or automotive battery output circuit, and connects it to the preregulator. Similarly, to charge a 24 volt battery, the user connects the 24 volt output circuit to the preregulator. Preferably, the connection involves snapping a housing into place, wherein an electrical connection and a structural connection is made. For example, a portable power tool battery is connected to the tool to make both an electrical and a structural connection.

The invention contemplates multiple output circuits connected to a preregulator at one time, as shown in FIG. 1. In such an embodiment, each output circuit includes its own control circuitry (that is part of controller 110) to provide the required output (which can be sensed, set, or fixed as described above). Each output circuit receives the dc bus and inverts or converts it to its particular desired output. The various output circuits may be identical or different and may provide the same or different outputs.

As described above, charging current and voltage (and battery temperature in some embodiments) is provided to controller 110. That information, or other battery characteristics, is used, in various embodiments, to determine whether a battery is defective (cannot be properly charged), either because it has reached the end of its recharging life or perhaps because of a manufacturing defect or it has been damaged. Temperature can be directly monitored or remotely sensed, such as by an infrared sensor, for example.

Controller 110 includes a defective battery sensor module 506 detects a defective battery by comparing the a battery characteristic such as current and/or voltage and/or temperature to a known profile. If the characteristic deviates beyond a threshold, controller 110 determines the battery is defective. For example, some charging schedules provide for trickle charging batteries having a voltage below a threshold. If the trickle charging fails to raise the voltage above a threshold, that battery is deemed defective. The components and or software used to detect the inability to properly charge are referred to as a defective battery sensor module.

When controller 110 determines a battery is defective it activates a user-noticeable output 508 such as a warning light, audible alarm, an instant message sent remotely or an email message. The warning can be sent by a wired connection or a wireless connection. User-noticeable output, as used herein, includes a warning indicator on a housing (such as on the housing for the output circuit or the preregulator), or a message sent to a telephone, pda, computer, remote indicator, etc.

Numerous modifications may be made to the present invention which still fall within the intended scope hereof. Thus, it should be apparent that there has been provided in accordance with the present invention a method and apparatus for battery charging that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A battery charging system, comprising:
    an input circuit, configured to receive an input signal and to provide a first dc signal;
    a plurality of user-removable output circuits, each configured to receive the first dc signal and each designed to provide a battery charging signal at a desired voltage and a desired current, wherein a chosen one of the plurality is connected at a time, wherein the desired voltage for a first one of the plurality of user-removable output circuits is different than the desired voltage for a second one of the plurality of user-removable output circuits; and
    a controller, configured to provide at least one control signal to the chosen one output circuit.

2. The battery charging system of claim 1, wherein the input circuit includes a rectifier and a boost converter or a buck-boost converter, and further including an input controller that provides power factor correction.

3. The battery charging system of claim 2, wherein the first dc signal has a substantially constant magnitude and the range of magnitudes spans a range of at least a factor of two.

4. The battery charging system of claim 1, wherein the controller includes a charging schedule module and receives at least one of a voltage feedback signal indicative of the voltage magnitude of the battery charging signal and a current feedback signal indicative of the current magnitude of the battery charging signal.

5. The battery charging system of claim 4, wherein the controller includes a battery selection input, and wherein the charging schedule module is responsive to the battery selection input.

6. The battery charging system of claim 5, wherein the battery selection input is connected to a user-selectable input.

7. The battery charging system of claim 5, wherein the battery selection input is connected to a battery sensor.

8. The battery charging system of claim 7, wherein the battery sensor includes an RFID sense circuit disposed to be sense an RFID tag on a battery being charged.

9. The battery charging system of claim 4, wherein the output circuit includes a switched converter.

10. The battery charging system of claim 4, wherein the switched converter is a pulse width or frequency modulated inverter.

11. The battery charging system of claim 4, wherein the switched converter is a pulse width or frequency modulated forward converter.

12. The battery charging system of claim 4, wherein the controller includes a defective battery sensor module that receives as an input a second at least one of the voltage feedback signal and the current feedback signal, and provides a user-noticeable output indicative of a defective battery.

13. A method of battery charging, comprising:
converting an input signal to a first dc signal; and
selecting one of a plurality of user-removable output circuits, each designed for a battery voltage, and using the selected output circuit, changing the first dc signal into a second dc signal having a current suitable for battery charging, wherein the battery voltage for a first one of the plurality of user-removable output circuits is different than the battery for a second one of the plurality of user-removable output circuits.

14. The method of claim 13, wherein converting includes boost converting and power factor correcting such that the first dc signal has a magnitude independent of a range of magnitudes of the input signal.

15. The method of claim 14, wherein the first dc signal has a substantially constant magnitude and the range of magnitudes spans a range of at least a factor of two.

16. The method of claim 13, further comprising controlling a charging current in response to at least one of a voltage feedback signal and a current feedback signal.

17. The method of claim 16, wherein the controlling a charging current is responsive to a user-selectable input.

18. The method of claim 16, wherein the controlling is responsive to sensing a battery to be charged.

19. The method of claim 18, wherein sensing includes sensing an RFID tag on the battery.

20. The method of claim 18, wherein converting includes one of buck-boost converting and boost converting.

21. The method of claim 20, wherein changing includes switching a converter.

22. The method of claim 21, further comprising monitoring a battery for being capable of being charged properly, and providing an indication if the battery cannot be charged properly.

23. A battery charging system, comprising:
converter means for receiving an input signal and providing a converter output; and
a plurality of user-removable output means for receiving the converter output and providing a battery charging signal, wherein each output means is further for providing the battery charging at a desired voltage, wherein a selected one of the plurality is connected to the converter means at one time, wherein the desired voltage for a first one of the plurality of user-removable output means is different than the desired voltage for a second one of the plurality of user-removable output means.

24. The battery charging system of claim 23, further comprising an output control means for controlling the selected one output means, connected to the selected one output means.

25. The battery charging system of claim 24, further comprising a converter control means for controlling the converter to provide power factor correction and to provide the converter output at a desired voltage, and connected to the converter.

26. The battery charging system of claim 25, wherein the converter means includes one of a boost and a buck-boost converter, and wherein the converter output has a magnitude independent of a range of magnitudes of the input signal.

27. The battery charging system of claim 26, wherein the output control means further is for controlling a charging current in response to at least one of a voltage feedback signal and a current feedback signal.

28. The battery charging system of claim 27, wherein the output control means is responsive to a user-selectable input.

29. The battery charging system of claim 23, further comprising means for sensing a battery to be charged, and controlling the charging current in response thereto.

30. The battery charging system of claim 29 wherein the means for sensing a battery includes means for sensing an RFID tag.

31. The battery charging system of claim 29, wherein each output means includes a dc-dc converter.

32. The battery charging system of claim 29, wherein each output means includes a pulse width or frequency modulated inverter.

33. The battery charging system of claim 29, wherein output means includes a pulse width or frequency modulated forward converter.

34. The battery charging system of claim 29, further comprising means for monitoring a battery for being capable of being charged properly, and providing an indication if the battery cannot be charged properly.

35. A battery charging system, comprising:
an input circuit, configured to receive an input signal and to provide a first dc signal;
a plurality of output circuits, each configured to receive the first dc signal and each designed to provide a battery charging signal at a desired voltage and a desired current, wherein the desired voltage for a first one of the plurality of output circuits is different than the desired voltage for a second one of the plurality of output circuits, and
a controller, configured to provide at least one control signal to each of the plurality of output circuits.

36. The battery charging system of claim 35, wherein the input circuit includes a rectifier and a boost converter or a buck-boost converter, and further including an input controller that provides power factor correction.

37. The battery charging system of claim 35, wherein the controller includes a battery selection input, and wherein a charging schedule module is responsive to the battery selection input.

38. The battery charging system of claim 37, wherein the battery selection input is connected to a battery sensor.

39. The battery charging system of claim 38, wherein the battery sensor includes an RFID sense circuit disposed to be sense an RFID tag on a battery being charged.

40. A method of battery charging, comprising:
converting an input signal to a first dc signal; and
using a plurality of output circuits, each designed for a battery voltage, to change the first dc signal into a plurality of charging dc signals suitable for battery charging, wherein the battery voltage for a first one of the plurality of output circuits is different than the battery voltage for a second one of the plurality of output circuits.

41. The method of claim 40, wherein converting includes boost converting and power factor correcting such that the first dc signal has a magnitude independent of a range of magnitudes of the input signal.

42. The method of claim 41, wherein the controlling is responsive to sensing a battery to be charged.

43. The method of claim 42, wherein sensing includes sensing an RFID tag on the battery.

44. A battery charging system, comprising:
 converter means for receiving an input signal and providing a converter output; and
 a plurality of output means for receiving the converter output and providing a plurality of battery charging signals, wherein the battery charging signal for a first one of the plurality of output means has a first voltage that is different than a second voltage of the battery charging signal for a second one of the plurality of output means.

45. The battery charging system of claim 44, further comprising an output control means for controlling the plurality of output means, connected to each of the plurality of the output means.

46. The battery charging system of claim 45, further comprising a converter control means for controlling the converter to provide power factor correction and to provide the converter output at a desired voltage, and connected to the converter means.

47. The battery charging system of claim 44, further comprising means for sensing at least one battery to be charged, and controlling a charging current in response thereto.

48. The battery charging system of claim 47 wherein the means for sensing a battery includes means for sensing an RFID tag.

* * * * *